No. 833,674. PATENTED OCT. 16, 1906.
M. ESCUDER Y CASTELLÁ.
SUGAR BOWL.
APPLICATION FILED NOV. 7, 1905.

2 SHEETS—SHEET 1.

Witnesses
G. R. Thomas
Edward N. Sarton

Inventor
Miguel Escuder y Castellá
By Richards
Attorneys

No. 833,674. PATENTED OCT. 16, 1906.
M. ESCUDER Y CASTELLÁ.
SUGAR BOWL.
APPLICATION FILED NOV. 7, 1905.

2 SHEETS—SHEET 2.

Witnesses
C. R. Thomas
Edward N. Sarton

Inventor
miguel escuder y castellá
By
Attorneys

UNITED STATES PATENT OFFICE.

MIGUEL ESCUDER Y CASTELLÁ, OF HAVANA, CUBA.

SUGAR-BOWL.

No. 833,674.　　　Specification of Letters Patent.　　　Patented Oct. 16, 1906.

Application filed November 7, 1905. Serial No. 286,316.

*To all whom it may concern:*

Be it known that I, MIGUEL ESCUDER Y CASTELLÁ, a subject of the King of Spain, residing at G. St. Vedado, in the city of Havana, Republic of Cuba, have invented a new and useful Sugar-Bowl, (for which a patent has been applied for from the Republic of Cuba by an application filed at the Department of Agriculture, Industry, and Commerce on the 25th of May, 1905,) of which the following is a full, clear, and exact specification.

This invention relates to a receptacle for containing sugar and the like from which the sugar is delivered in small quantities at a time; and the object of the invention is to keep the receptacle tightly closed at all times, so as to prevent contamination of the sugar by insects, dust, and the like and also to prevent the user from taking the sugar directly from the bowl by a spoon or the fingers.

The invention is illustrated in the accompanying drawings, in which—

Figure 1:
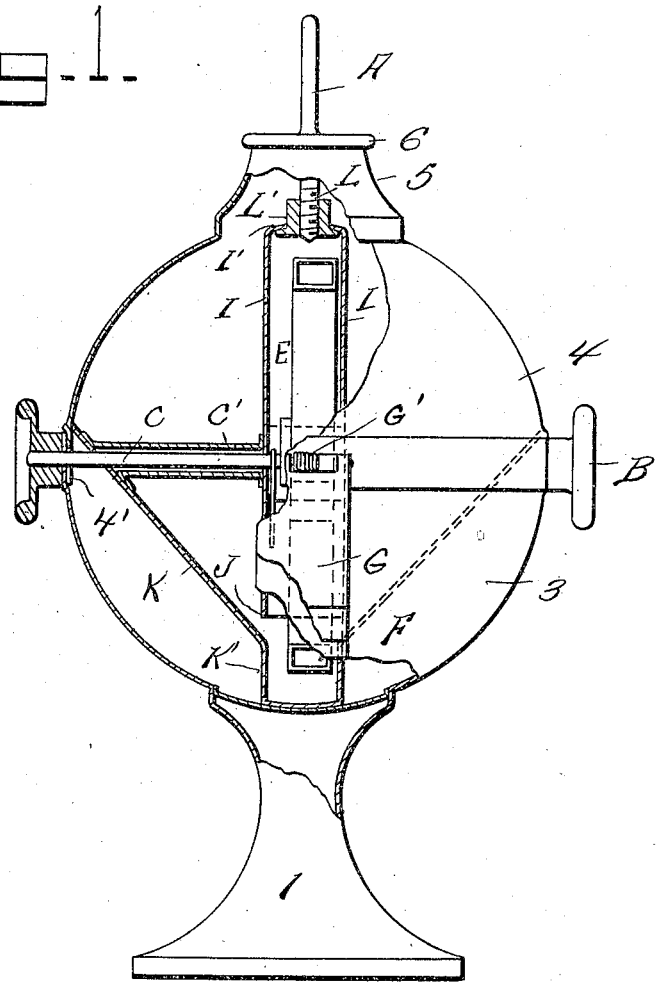
Figure 2:
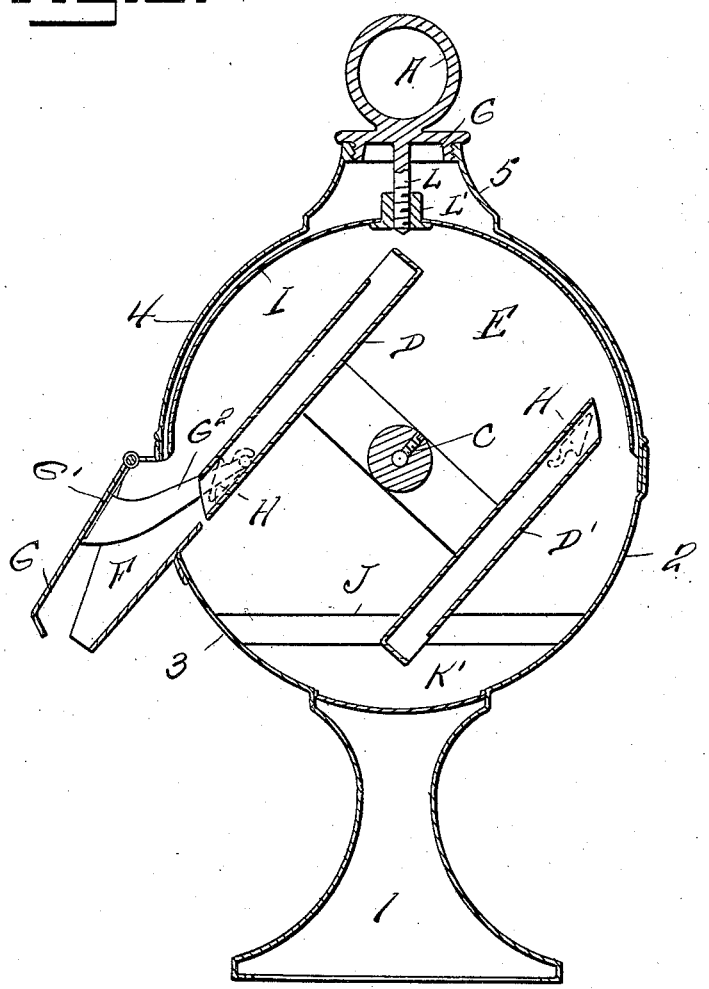

Figure 1 is a front view, partly in section; and Fig. 2 is a vertical section of Fig. 1.

1 is the base of the bowl, which supports the casing 2, which is preferably of spherical form. Said casing consists of a lower stationary part 3 and a removable upper part 4. The lower edge of the upper part overlaps the edge of the lower part, so as to form a tight connection. A shaft C passes through the spherical casing, and connected to the ends of said shaft outside the casing are two knobs B, by which the shaft may be rotated. The shaft C is carried by the lower part 3 of the casing, the upper part 4 having notches 4' in its edge to permit said edge to pass down below the plane of said shaft. Spoons or scoops D D' are secured to the shaft, and these spoons rotate in a chamber E, formed by the vertical walls I. Said walls are carried by the lower part 3 of the casing, and they extend up into the part 4, as shown in the drawings. A screw-threaded nut L' is carried by a bridge-piece I' at the top of the chamber E. A dome-shaped part 5 is formed on the top part of the upper portion 4. The top of the dome is open, and this opening is closed by a cover 6, having a handle A and a screw-threaded pin L, which engages with the nut L' to lock the parts of the bowl together. The cover may also have screw-threaded connection with the walls of the opening in the dome, as shown. The walls I of the chamber E extend down to a point J, and the bottom of the chamber is formed by short vertical portions K' of inclines K, which extend from the top of the lower part 3 to the bottom thereof, as shown in Fig. 1. By this means the sugar is caused to fall by gravity to the bottom of the chamber E, where it is picked up by the scoops D D'. The shaft C is separated from the interior of the casing by a sleeve C'. A chute F, through which the sugar is delivered, is formed in the lower part 3 of the casing, and this chute is closed by a door G, controlled by a spring G'. A lever $G^2$ is secured to the door, and this lever projects into the path of lugs H H', carried on the scoops, so that when the lever is struck by said lugs the door will be opened. The scoops D D' have openings at both ends for the entrance and discharge of the sugar.

The operation of the device is as follows: To fill the bowl, the top 6 is turned so as to unscrew the pin L from the nut L' and the cover removed. The upper part 4 may then be removed, if desired; but for the purpose of filling the bowl it is only necessary to remove the cover 6. After the bowl is filled and the cover secured in place, the bowl is ready to be placed in use. When a quantity of sugar is desired, the shaft is turned by means of one of the knobs B, so that the scoops will dip into the sugar at the bottom of the chamber E and take up a small quantity thereof, and as the shaft continues to turn the lug H on the scoop will come in contact with the end of the lever $G^2$ and force the door G open, thus permitting the sugar that has been delivered from the scoop into the chute F to fall into the cup or other article placed to receive it. As soon as the lug H passes below the lever the spring will cause the door G to shut. As shown in the drawings, the spoons or scoops work without being impeded by the sugar, as they are separated from it by the walls I.

I claim as my invention—

1. A sugar-bowl comprising a casing, an outlet-chute, a spring-controlled door for closing said chute, a rotatable shaft passing through the casing, scoops on said shaft for scooping up the sugar and delivering it to the chute and means for opening the door actuated by the rotation of the shaft.

2. A sugar-bowl comprising a spherical casing, a chute thereon, a spring-controlled door for said chute, a lever connected to said door and projecting into the casing, a rotatable shaft passing through the casing, scoops carried on said shaft, for scooping up the sugar and delivering it to the chute and a projection on each scoop for contacting with the lever to open the door.

3. A sugar-bowl comprising a spherical casing, an outlet-chute, a spring-controlled door for said chute, a central vertical chamber formed in said casing having its lower end communicating with the interior of the casing, inclines in the lower part of said casing for directing the sugar to the said lower end of the chamber, a shaft passing through the casing and chamber, scoops on said shaft within the chamber for taking the sugar from the lower end of the chamber and delivering it to the chute and means connected with the scoops for opening the door.

In testimony that I claim the foregoing as my invention I have signed my name in full, at the city of Havana, Cuba, this 31st day of October, 1905.

MIGUEL ESCUDER Y CASTELLÁ.

Witnesses:
  P. M. PICABIA,
  JAMES H. SPRINGER.